United States Patent
Evans

(10) Patent No.: US 8,437,310 B2
(45) Date of Patent: May 7, 2013

(54) HANDOVER CONTROL

(75) Inventor: Gareth D Evans, Ipswich (GB)

(73) Assignee: British Telecommunications public limited company, London (GB)

( * ) Notice: Subject to any disclaimer, the term of this patent is extended or adjusted under 35 U.S.C. 154(b) by 285 days.

(21) Appl. No.: 12/863,766

(22) PCT Filed: Dec. 19, 2008

(86) PCT No.: PCT/GB2008/004237
§ 371 (c)(1),
(2), (4) Date: Jul. 20, 2010

(87) PCT Pub. No.: WO2009/092990
PCT Pub. Date: Jul. 30, 2009

(65) Prior Publication Data
US 2010/0284374 A1   Nov. 11, 2010

(30) Foreign Application Priority Data
Jan. 25, 2008   (EP) .................................. 08250313

(51) Int. Cl.
H04Q 7/00  (2006.01)
H04W 36/00 (2009.01)

(52) U.S. Cl.
USPC .......................................... 370/331; 455/426

(58) Field of Classification Search .................. None
See application file for complete search history.

(56) References Cited

U.S. PATENT DOCUMENTS
5,101,503 A    3/1992  Furuya
2002/0037725 A1 3/2002 Masuda et al.
2002/0082012 A1 6/2002 Wang et al.
2002/0173312 A1 11/2002 Takano et al.
2003/0114159 A1* 6/2003 Park et al. .................... 455/436

(Continued)

FOREIGN PATENT DOCUMENTS
CN   1889768   1/2007
CN   1984425   6/2007

(Continued)

OTHER PUBLICATIONS

International Search Report for PCT/GB2008/004237, mailed Mar. 5, 2009.

(Continued)

Primary Examiner — Andrew Lee
(74) Attorney, Agent, or Firm — Nixon & Vanderhye P.C.

(57) ABSTRACT

The signal strength available to a mobile unit is periodically monitored (21), and if it falls below a threshold value X(off) the handset (40) determines whether the signal strength on an alternative network is greater than a value Y(on). If such a connection is available, a handover attempt is initiated (3). If the handover attempt (3) fails (step 4), the relevant threshold value X(off) and Y(on), depending on the cause of failure, is then raised (40) so that future handoffs are not attempted in those same conditions. If the call fails in these circumstances, the caller will have to establish a new call (step 1). If the handover is successful, (step 5) then one or both of the handover thresholds (X(off), Y(on)) may be lowered (step 51), allowing future handovers to take place more promptly. Lowering may be done in smaller increments than increases, or less frequently. By varying the threshold values empirically more efficient handover can be achieved than by pre-setting a permanent value.

14 Claims, 3 Drawing Sheets

U.S. PATENT DOCUMENTS

| | | | |
|---|---|---|---|
| 2003/0153272 A1* | 8/2003 | Takano | 455/67.1 |
| 2004/0147264 A1* | 7/2004 | Ogawa | 455/441 |
| 2005/0239472 A1* | 10/2005 | Wei | 455/452.2 |
| 2007/0191013 A1* | 8/2007 | Gunnarsson et al. | 455/438 |
| 2008/0002790 A1 | 1/2008 | Itoh | |
| 2010/0296409 A1* | 11/2010 | Fok et al. | 370/252 |

FOREIGN PATENT DOCUMENTS

| | | |
|---|---|---|
| EP | 1 244 318 | 9/2002 |
| EP | 1 740 010 | 1/2007 |
| GB | 2 337 184 | 11/1999 |
| JP | 2-190039 | 7/1990 |
| JP | 2002-95030 | 3/2002 |
| JP | 2003-37554 | 2/2003 |
| JP | 2007-325142 | 12/2007 |
| WO | WO 00/38456 | 6/2000 |

OTHER PUBLICATIONS

Office Action (4 pgs.) dated Aug. 3, 2012 issued in corresponding Chinese Application No. 200880124790.7 with an at least partial English-language translation thereof (5 pgs.).

Office Action (2 pgs.) dated Jan. 15, 2013 issued in corresponding Japanese Application No. 2010-543553 with an at least partial English-language translation thereof (2 pgs.).

Office Action (6 pgs.) dated Mar. 7, 2013 issued in corresponding Chinese Application No. 200880124790.7 with an at least partial Translation thereof (7 pgs.).

* cited by examiner

HANDOVER CONTROL

This application is the U.S. national phase of International Application No. PCT/GB2008/004237 filed 19 Dec. 2008, which designated the U.S. and claims priority to GB Application No. 08250313.7 filed 25 Jan. 2008, the entire contents of each of which are hereby incorporated by reference.

BACKGROUND AND SUMMARY

This invention relates to handover control for multi-mode wireless devices: that is to say, devices which are able to support two or more wireless interfaces. Some of these devices are able to hand over a data connection or voice call from one wireless interface to another without the session or call being dropped. Such arrangements are particularly useful for handsets capable of operating on both localised high bandwidth systems such as WLANs (Wireless local area networks) and public cellular networks which have greater geographical penetration but more limited facilities for example in bandwidth.

The decision as to when to hand over is typically taken by the device, by monitoring one or more parameters such as signal strength on both the current interface and the candidate for handover, so that if a predetermined threshold is reached indicating the availability of a better interface than the one currently in use, a handover from the current wireless interface to the other, better, one is initiated. It is known for handover to be initiated only if the difference in signal strength exceeds a predetermined value, to avoid too-frequent handovers when the signal strengths are similar. It is also known for the thresholds to be weighted, for example so that a cheaper or feature-rich service is favoured over another service.

Typically a single parameter is measured and a handover threshold selected, though in some cases multiple parameters are monitored and an algorithm based upon the parameters and one or more thresholds used to determine whether to hand over or not.

It is known to modify criteria for handover between one base station and another in the same network in response to handover failures. In this situation handover is readily initiated because the handset and base station are continuously exchanging data relating to the availability of neighbouring base stations. However, if it is desired to switch between one network and another, only the handset has all the necessary information as the base stations are not in co-operation with each other—indeed it is more likely to be in each operators' commercial interests to seize control of the mobile unit from the other networks.

Network operators spend a lot of time, effort and money optimising the handover thresholds so that handsets maximise their coverage for the optimum network without the reliability of handovers dropping too much for any usage case. Setting a handover threshold so that a handover is attempted too late may result in the handover proving unsuccessful. However, the selection of the threshold for handover is more critical when switching between networks, because attempting a handover earlier than necessary may be disadvantageous, particularly if the second interface is more expensive to connect to, or lacks capabilities available on the first, or if the advantage it offers is temporary because of variations in signal quality on one or both networks.

Current practice bases handover decisions on a fixed set of thresholds for parameters which are combined in an algorithm to decide whether to initiate handover or not, as shown in the flow-chart of FIG. 1. In that figure, after a call is initiated (1) on a first network, an assessment (2) is made periodically to determine whether to hand over. If the decision is made to do so, the handover (3) takes place. If the handover is unsuccessful the call will fail (4), otherwise it continues (5) until the next periodic assessment (2). Note that the review period (6) may vary according to the network to which the handset is currently connected. United Kingdom Patent Application GB2337184 discloses a mobile unit which applies a default threshold condition, from which it may depart if conditions improve, but to which it reverts if contact is lost.

According to the invention, there is provided a wireless communications device having a handover processor for controlling the handover of connection of the device from a first communications network to a second communications network, having a signal quality assessment system for determining values for one or more measure of signal quality currently available from at least one of the communications networks, and determining whether the measure or measures of signal quality meet threshold values set for that network, a handover processor for initiating a handover attempt if the threshold values are met, and a threshold setting unit for adjusting one or more of the threshold values according to the success or failure of the handover attempt.

The invention also provides a process for controlling handover of a connection between two co-operating devices between a first communications network and a second communications network, in which values for one or more measure of signal quality are determined in at least one of the communications networks, the measure or measures of signal quality are compared with threshold values set for that network. A handover attempt is initiated if the threshold values are met, and one or more of the threshold values are adjusted according to the success or failure of the handover attempt.

Where one of the communications networks is to be used in preference to the other, but the other is of ubiquitous availability, it is only necessary to measure the threshold values for the preferred system. To avoid too-frequent failure of the handover process, adjustment of the thresholds in the event of a successful handover may be more limited, in frequency or magnitude, than adjustments made in consequence of a handover failure.

This invention can be used for both handset-initiated handovers and for network-initiated handovers.

This invention differs from existing systems by introducing an iterative process to learn the optimum settings for handover thresholds from experience. The advantage of this is that it enables the handover thresholds to be optimised for the actual equipment in use and the way it is used, rather than making use of a conservative threshold for all devices and environments.

This invention would significantly reduce the existing costs expended by network operators or handset manufacturers in determining the optimum handover thresholds for installing in the network or handsets. Instead, the handset or network automatically optimises coverage in use, for many different usage cases.

BRIEF DESCRIPTION OF THE DRAWINGS

An embodiment of the invention will be described by way of example with reference to the Figures, in which.

DETAILED DESCRIPTION OF PRESENT EXAMPLE EMBODIMENTS

Figure 4:
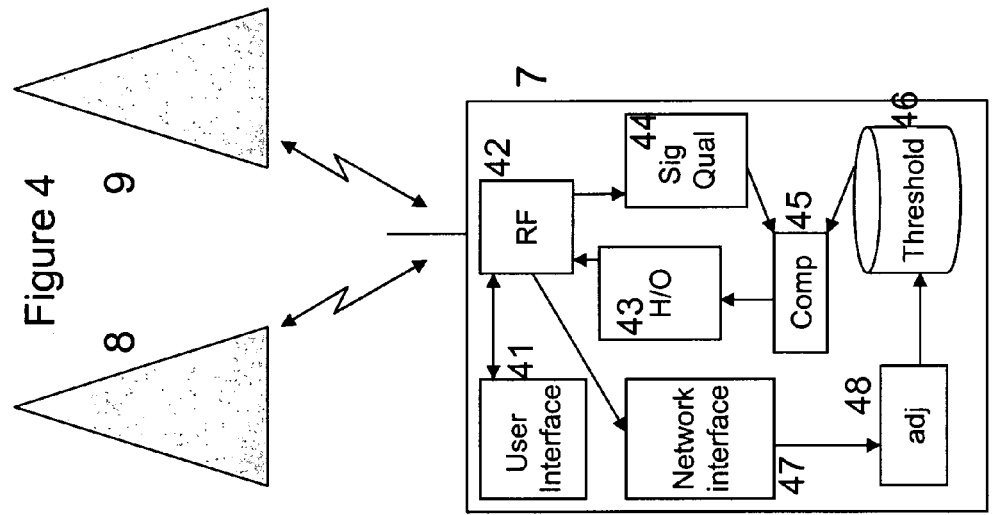
FIG. 4 is a schematic diagram depicting the elements of a wireless handset device to which the invention may be applied.
Figure 1:
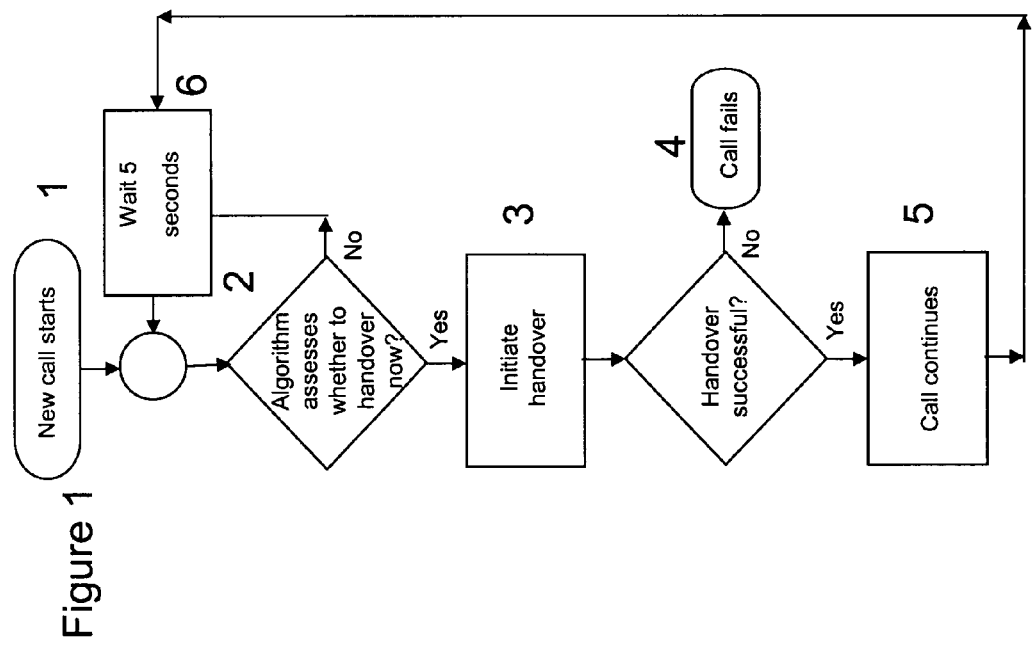
FIG. 1 illustrates the prior art handover process already discussed

The handset 7 comprises a user interface 41 for processing inputs such as audio or keyboard entries and generating outputs such as audio or text displays. These inputs and outputs are encoded/decoded and modulated/demodulated by a wireless (RF) interface 42 to allow communication with two different networks 8, 9. Handover between the networks is handled by a handover processor 43. This includes a signal quality measuring system 44, and a comparison processor 45 which compares the measured signal qualities with a stored threshold value 46. The output of the comparison processor 45 causes the handover processor 43 to initiate a handover attempt if the threshold values are met. A network interface unit 47 handles interactions with the network, such as location update, and also detects loss of contact with the network. The success or failure of a handover is reported by the network interface 47 to a threshold setting unit 48 which generates adjustments to the stored threshold values 46 according to the success or failure of individual handover attempts.

Figure 2:
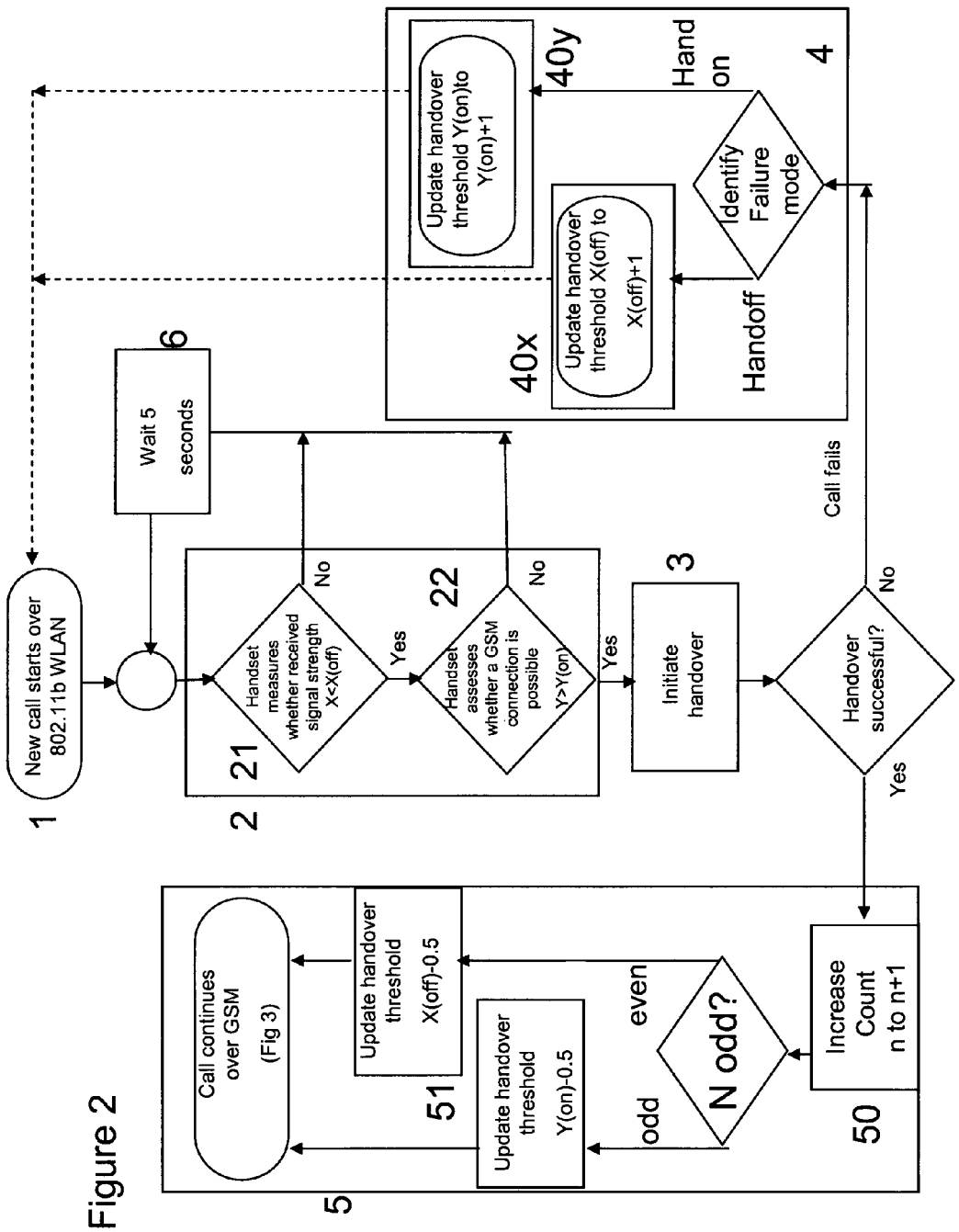
FIG. 2 illustrates a modified handover process according to the invention.
Figure 3:
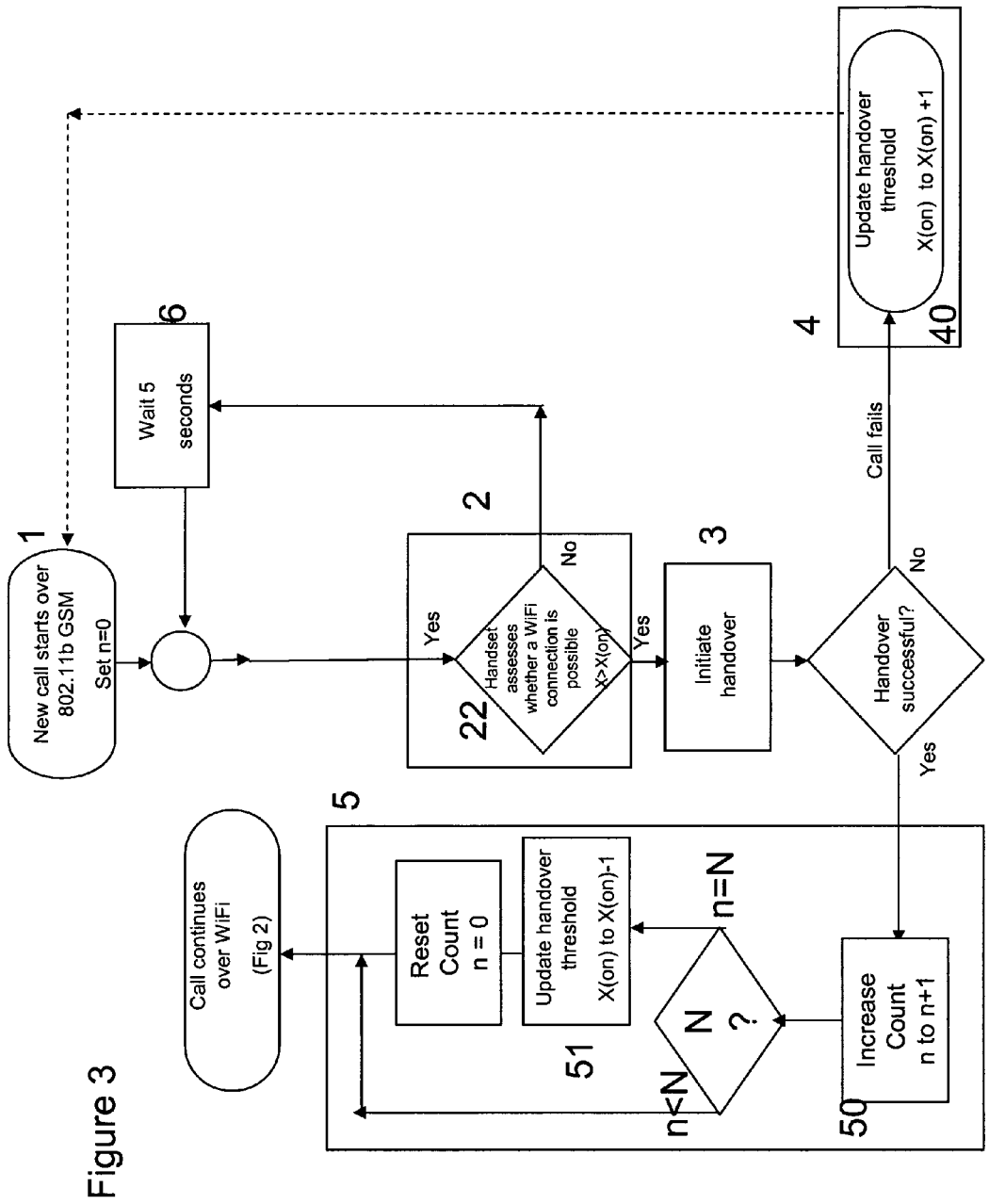
FIG. 3 illustrates a variant of the modified handover process according to the invention.

The flow-charts of FIGS. 2 and 3 illustrate an embodiment running on a handset (7, FIG. 4) which supports calls over both 802.11b WLAN (WiFi) and GSM (cellular) wireless systems (8, 9). As already mentioned, the invention may also be run on the fixed infrastructure of a mobility network, to control network-initiated handovers. The flow-chart of FIG. 2 shows the scenario for this invention whereby a call (1) is started over the WLAN (8) and then the WLAN signal strength is periodically monitored (21). Properties other than signal strength, such as signal quality, signal to noise ratio, bit-error-rate or packet error rate, or combinations of such properties, may also be used as thresholds. If it falls below a value X(off) the handset 40 determines whether a GSM connection 9 is available (22). This is done by determining whether the signal strength is greater than a value Y(on). If such a connection is available, the handover attempt is initiated (3).

The handover attempt (3) may fail (step 4), either because the quality of the connection 9 to which the handset is attempting handover is not adequate (branch 40x), or more usually because the quality of the existing connection 8 deteriorates further, to the point where connection is lost before the handover is completed (branch 40y). If this happens, the relevant threshold value X(off) and Y(on) is then raised (40) so that future handoffs are not attempted in those same conditions. Raising the threshold value Y(on) of the destination network 9 will prevent future handoffs being attempted to a network exhibiting such a low signal strength. Conversely, raising the threshold value X(off) of the originating network 8 will have the effect of causing any handover which is to be initiated to be started sooner, before the signal strength has deteriorated too far to complete the handover.

Other failure modes may require modification of both thresholds.

If the handover is successful, (step 5) then one or both of the handover thresholds (X(off),Y(on)) are lowered (step 51). This will cause future handovers to take place less promptly, allowing unnecessary handovers to be avoided. Because the consequences of setting the thresholds too low (failure of call) are more severe than the consequences of setting them too high (reduced efficiency or extra cost), more caution is required in reducing the threshold, so the conditions for reduction of the threshold should be more stringent than for raising it. This may be achieved by having reductions in threshold operating in smaller increments than those used for increases, (as shown in FIG. 2, increments are in steps of 1, but reductions in steps of 0.5). As shown in FIG. 2, the thresholds may also be incremented alternately on successive successful handovers, rather than both being incremented together. Alternatively, it may be required that a number of successful handovers are to be completed (step 50, FIG. 3) before the threshold is updated. This is in contrast to the behaviour in the event of a call failure (4), which will result in immediate modification of at least one of one of the thresholds X(off), Y(on) (step 40). The choice of which to modify preferably depends on the nature of the handover failure.

As shown by the dotted line in FIGS. 2 and 3, in the event of a handover failure, the user terminal may attempt to reconnect immediately. Such reconnection will of course use the higher thresholds and thus should succeed.

As shown in FIG. 3, when a call is running over the GSM network 9, the process may work in the same way as that shown in FIG. 2, but using different threshold criteria. In the example of FIG. 3, when the GSM signal strength falls below a value Y(off) the call hands over to the WLAN 8, if the available WLAN signal strength (or whatever property of combination of properties is used) is greater than a value X(on). However, in FIG. 3 the WLAN connection 8 is preferred over the GSM network 9, so handover 3 to the WLAN may be attempted whenever the signal strength of that network exceeds a threshold X(on) (test 22) regardless of the GSM strength. Thus the signal quality of the current (GSM) connection is not an issue in determining whether a handover should take place and the step (21, FIG. 2) of assessing quality of the current network is unnecessary. The threshold is modified as before (40, 51) according to the outcome of the handover attempt (3).

Initial values of thresholds X(on) Y(on) X(off) Y(off) for different networks will typically differ, to take account of preferences for using one network or the other for reasons of cost, available facilities, etc, and maximum and minimum values for these thresholds may be specified to prevent updates disrupting these preferences.

The invention may also be employed in a network-initiated handover process. The appropriate handover threshold for a given base station may be dictated by circumstances such as the presence of physical obstructions, range of the transmitter, differing RF interference environments, the speed at, which users move in the locality, and other factors. Some of these factors may vary over time, for example if the base station is near a road designed for fast traffic but which is subject to frequent congestion, changes in topography such as tides, or longer term factors such as trees in leaf or temporary structures which cause changes in wireless reception characteristics. In order to accommodate such variations, the invention may determine the threshold values at which handover is to be initiated for each base station (of the same or different network technologies).

What is claimed is:

1. A portable handset, configured for wireless-communications, the portable handset comprising:
    a handover processor for controlling the handover of connection of the portable handset from a first communications network to a second communications network,
    a signal quality assessment system for determining values for one or more measure of signal quality currently available from at least one of the communications networks, and determining whether the measure or measures of signal quality meet threshold values set for that network, the handover processor being configured to initiate a handover attempt if the threshold values are met, and a threshold setting unit for iteratively increasing one or more of the threshold values when a handover attempt is not successful and iteratively decreasing one or more of the threshold values when a handover attempt is successful.

2. The portable handset according to claim 1, wherein adjustments of the thresholds in the event of a successful handover are more limited, in frequency or magnitude, than adjustments made in consequence of a handover failure.

3. The handset according to claim 1, wherein the signal quality assessment system is configured to: compare a plurality of measures of signal quality with respective threshold values set for the respective networks, iteratively increase each of the threshold values when a handover attempt is not successful, and iteratively decrease each of the threshold values when a handover attempt is successful.

4. A process performed by a portable handset, configured for wireless-communications, for controlling handover of a connection of the portable handset between a first communications network and a second communications network, in which values for one or more measure of signal quality are determined by the portable handset in respect of at least one of the communications networks, the measure or measures of signal quality are compared with threshold values set for that network, a handover attempt is initiated if the threshold values are met, and characterised in that one or more of the threshold values for the different networks are iteratively increased when a handover attempt is not successful and iteratively decreased when a handover attempt is successful.

5. The process according to claim 4, wherein the handset compares a plurality of measures of signal quality with respective threshold values set for the respective networks, iteratively increases each of the threshold values when a handover attempt is not successful, and iteratively decreases each of the threshold values when a handover attempt is successful.

6. A process according to claim 4, wherein adjustment of the thresholds in the event of a successful handover are of smaller magnitude than adjustments made in consequence of a handover failure.

7. A process according to claim 4, wherein thresholds are only adjusted in response to a successful handover when a predetermined number of such handovers have been achieved.

8. A portable handset, configured for wireless communications, the portable handset comprising:

a display; and a processing system, comprising at least one processor, configured to:

control handover of connection of the handset from a first communications network to a second communications network;

determine values for measured parameters with respect to the first communications network and the second communications network;

compare, in a first comparison, the value for a measured parameter with respect to the first communications network to a first threshold value;

compare, in a second comparison, the value for a measured parameter with respect to the second communications network to a second threshold value;

determine whether to initiate a handover attempt based on the first and second comparisons; and change the first and second threshold values in a first manner when a handover attempt is not successful, and change the first and second threshold values in a second manner, different from the first manner, when a handover attempt is successful.

9. The portable handset of claim 8, wherein the processing system is configured to: change the first and second threshold values in the first manner by increasing the first and second threshold values, and change the first and second threshold values in the second manner by decreasing the first and second threshold values.

10. The portable handset of claim 8, wherein measured parameters comprise respective signal strengths with respect to the first and second communications networks.

11. The portable handset of claim 8, wherein measured parameters comprise respective signal quality with respect to the first and second communications networks.

12. The portable handset of claim 8, wherein measured parameters comprise respective signal to noise ratios with respect to the first and second communications networks.

13. The portable handset of claim 8, wherein measured parameters comprise respective bit-error-rates with respect to the first and second communications networks.

14. The portable handset of claim 8, wherein measured parameters comprise respective packet error rates with respect to the first and second communications networks.

* * * * *